United States Patent
Li

(10) Patent No.: US 6,234,506 B1
(45) Date of Patent: May 22, 2001

(54) BICYCLE HANDLEBAR STEM AND FRONT FORK MOUNTING ARRANGEMENT

(76) Inventor: Ching Chang Li, No. 45, Kung 9th Rd., Yu Shin Industrial Zone, Tachia Town, Taichung Hsien (TW)

( * ) Notice: Subject to any disclaimer, the term of this patent is extended or adjusted under 35 U.S.C. 154(b) by 0 days.

(21) Appl. No.: 09/525,275

(22) Filed: Mar. 14, 2000

(51) Int. Cl.$^7$ .................................................. B62K 21/04
(52) U.S. Cl. ............................................................ 280/280
(58) Field of Search ..................................... 280/279, 280

(56) References Cited

U.S. PATENT DOCUMENTS

| | | | |
|---|---|---|---|
| 5,387,255 | * | 2/1995 | Chiang ................................. 74/551.1 |
| 5,442,973 | * | 8/1995 | Liao ..................................... 74/551.1 |
| 5,657,670 | * | 8/1997 | Lin ....................................... 74/551.1 |
| 5,678,836 | * | 10/1997 | Chen ..................................... 280/280 |
| 5,737,974 | * | 4/1998 | Chen ..................................... 74/551.1 |

* cited by examiner

Primary Examiner—Kevin Hurley
(74) Attorney, Agent, or Firm—Pro-Techtor International Services

(57) ABSTRACT

A bicycle handlebar stem and front fork mounting arrangement includes a front fork, a head tube mounted on the front fork, a ball bearing mounted on the front fork and supported on the head tube, a ball bearing cap mounted on the front fork and covered on the ball bearing, a tapered rubber ring mounted in a [⊐⊏]-shaped locating groove in the ball bearing cap at the top, a gasket ring mounted on the rubber ring and retained between a top flange of the rubber ring and the front fork, a handlebar stem coupled to the front fork and supported on the gasket ring, and a headset installed in an inner diameter of the front fork and fastened tight to the front fork to secure the handlebar stem to the front fork, the headset including a screw cap threaded into a screw hole in the front fork, a tightening up member and an expansible positioning ring, a screw bolt, and a pressure member threaded onto the screw bolt and moved to compress the tightening up member and the expansible positioning ring and to force the tightening up member and the expansible positioning ring against the inside wall of the front fork when the screw bolt is fastened tight.

3 Claims, 3 Drawing Sheets

BICYCLE HANDLEBAR STEM AND FRONT FORK MOUNTING ARRANGEMENT

BACKGROUND OF THE INVENTION

The present invention relates to a bicycle handlebar stem and front fork mounting arrangement, and more specifically to an improved structure of headset for positively securing the handlebar stem of a bicycle handlebar to a bicycle front fork.

In a bicycle, a headset is installed to secure the handlebar stem of the handlebar and the front fork together. The headset comprises a check member mounted inside the front fork, and a screw bolt rotated to move the check member between the locking position and the unlocking position. This structure of headset is not satisfactory in function because the check member wears quickly with use. The check member tends to be damaged or permanently deformed when fastening up the screw bolt. There is known another structure of headset designed to eliminate the aforesaid problem. This structure of headset comprises a locating member, a tightening up member, and a screw bolt rotated to move the tightening up member between the locking position and the unlocking position. This structure of headset is still not satisfactory in function. When rotating the screw bolt, the locating member and the tightening up member may be simultaneously rotated with the screw bolt, causing a locking error. Further, when the user loosening the screw bolt, the locating member and the tightening member may fall to the inside of the front fork.

SUMMARY OF THE INVENTION

The present invention has been accomplished to provide a bicycle handlebar stem and front fork mounting arrangement, which eliminates the aforesaid drawbacks. According to one aspect of the present invention, the bicycle handlebar stem and front fork mounting arrangement comprises a front fork, a head tube mounted on the front fork, a ball bearing mounted on the front fork and supported on the head tube, a ball bearing cap mounted on the front fork and covered on the ball bearing, a tapered rubber ring mounted in a tapered locating groove in the ball bearing cap at the top, a gasket ring mounted on the rubber ring and retained between a top flange of the rubber ring and the front fork, a handlebar stem coupled to the front fork and supported on the gasket ring, and a headset installed in an inner diameter of the front fork and fastened tight to the front fork to secure the handlebar stem to the front fork, the headset including a screw cap threaded into a screw hole in the front fork, a tightening up member and an expansible positioning ring, a screw bolt, and a pressure member threaded onto the screw bolt and moved to compress the tightening up member and the expansible positioning ring and to force the tightening up member and the expansible positioning ring against the inside wall of the front fork when the screw bolt is fastened tight. According to another aspect of the present invention, the screw cap has a polygonal head convenient for turning with a wrench.

DETAILED DESCRIPTION OF THE PREFERRED EMBODIMENT

Figure 1:
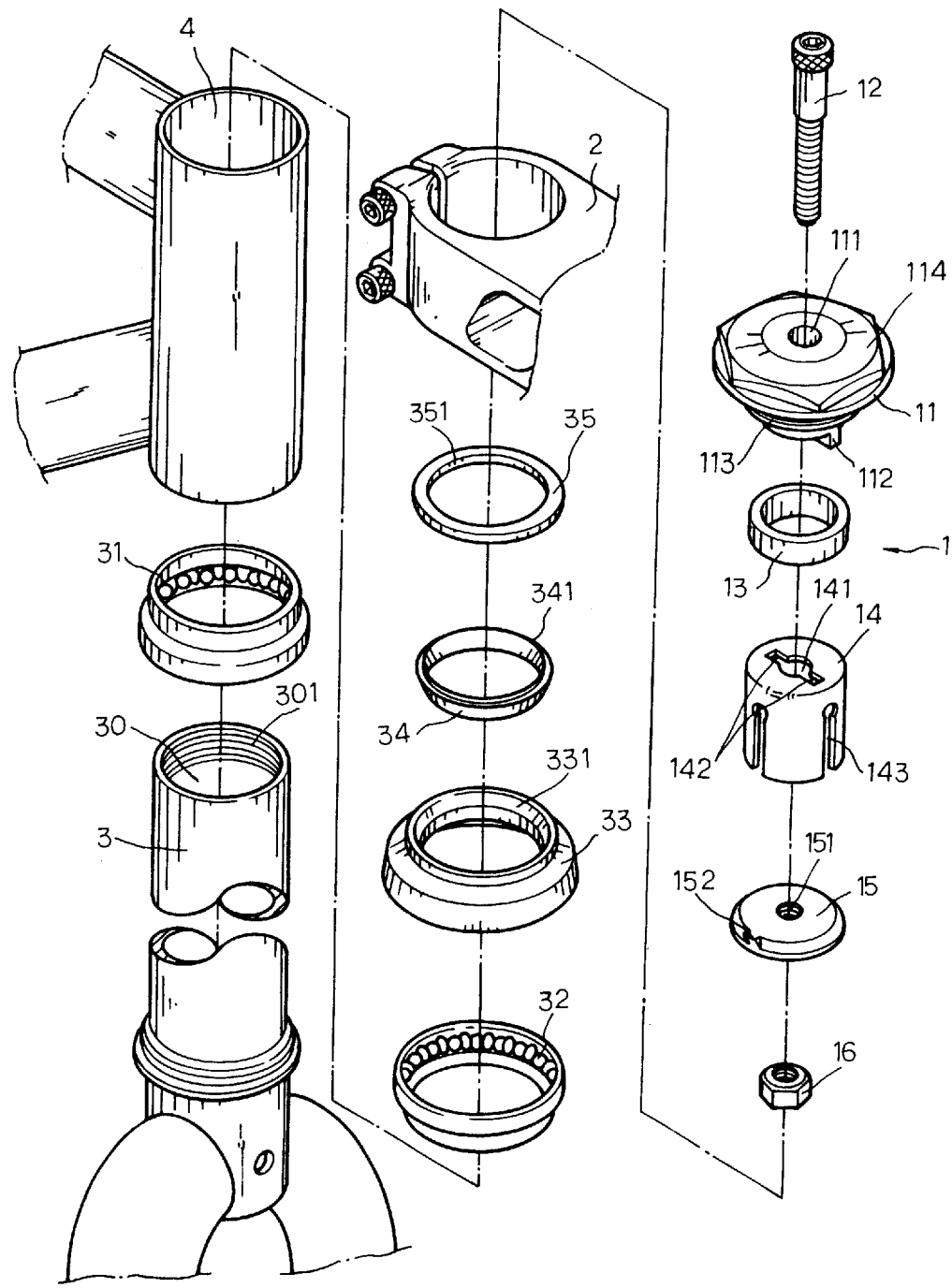
FIG. 1 is an exploded view of the preferred embodiment of the present invention.
Figure 3:
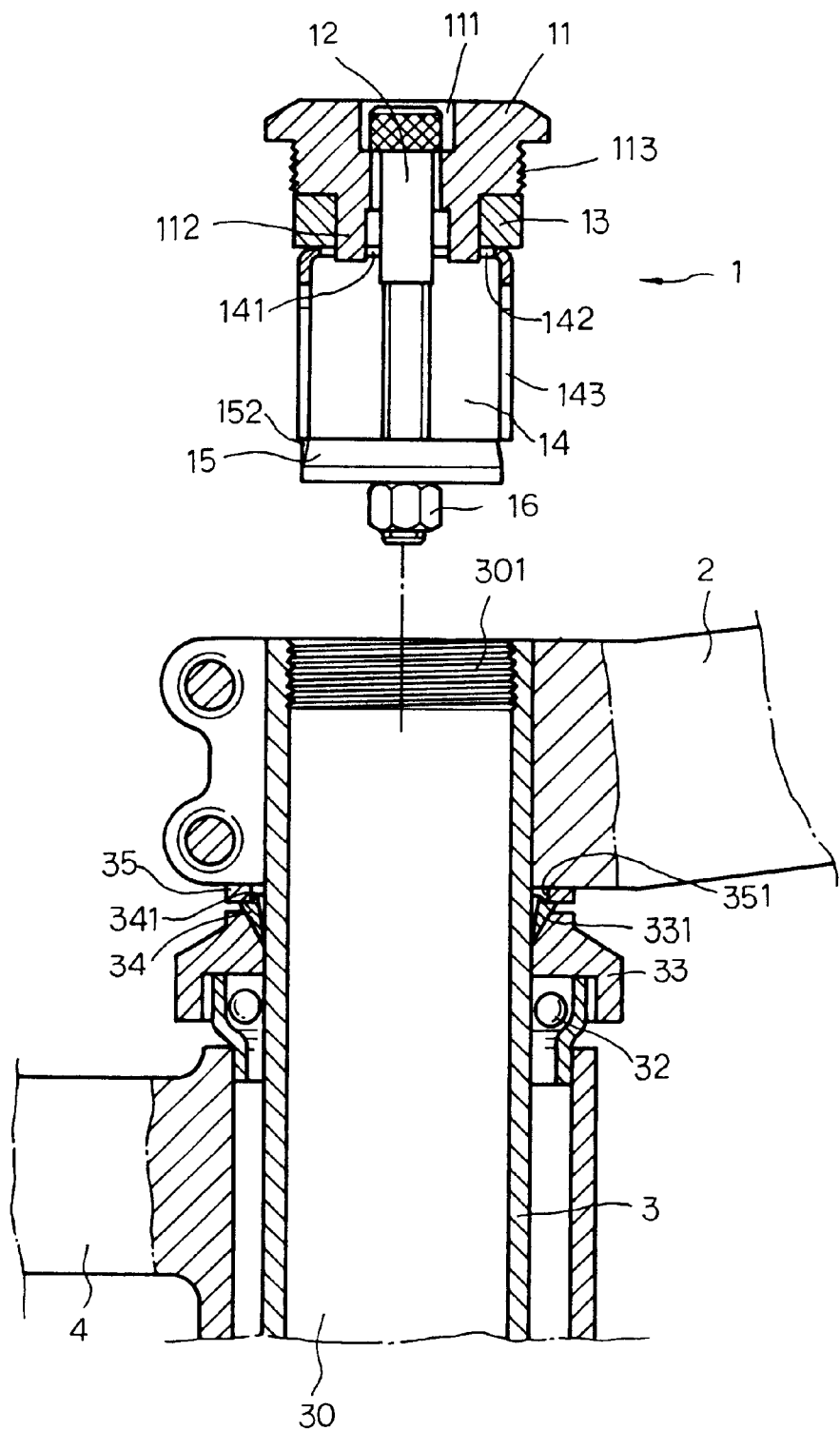
FIG. 3 is a sectional view of the preferred embodiment of the present invention before the installation of the headset.

Referring to FIGS. 1 and 3, a headset 1 is shown comprised of a screw cap 11, a screw bolt 12, an expansible positioning ring 13, a tightening up member 14, and a pressure member 15, and a stop member 16. The screw cap 11 comprises a head 114, a threaded shank 113 downwardly extended from the center of the bottom sidewall of the head 114, a countersunk hole 111 through the center of the head 114 and the threaded shank 113, and two coupling flanges 112 downwardly extended from the bottom end of the threaded shank 113. The expansible positioning ring 13 is a rubber ring mounted around the bottom coupling flanges 112 of the screw cap 11 at an upper side. The tightening up member 14 comprises a hollow, cylindrical member having a close top side, an open bottom side, a circular hole 141 through the center of the top sidewall thereof, two elongated locating holes 142 respectively disposed on the top sidewall and extended from the circular hole 141 at two opposite sides in reversed directions, and a plurality of longitudinal splits 143 respectively extended to the bottom open side. The pressure member 15 is a flat circular, tapered member having a center screw hole 151 and a peripheral projection 152. The screw bolt 12 is inserted through the countersunk hole 111 on the screw cap 11 and the circular hole 141 on the tightening up member 14 and threaded into the screw hole 151 on the pressure member 15. The stop member 16 according to the present preferred embodiment is a nut threaded onto the screw bolt 12 to secure the screw cap 11, the screw bolt 12, the tightening up member 14 and the pressure member 15 together, enabling the peripheral projection 152 of the pressure member 15 to be engaged into one of the longitudinal split 143.

Figure 2:
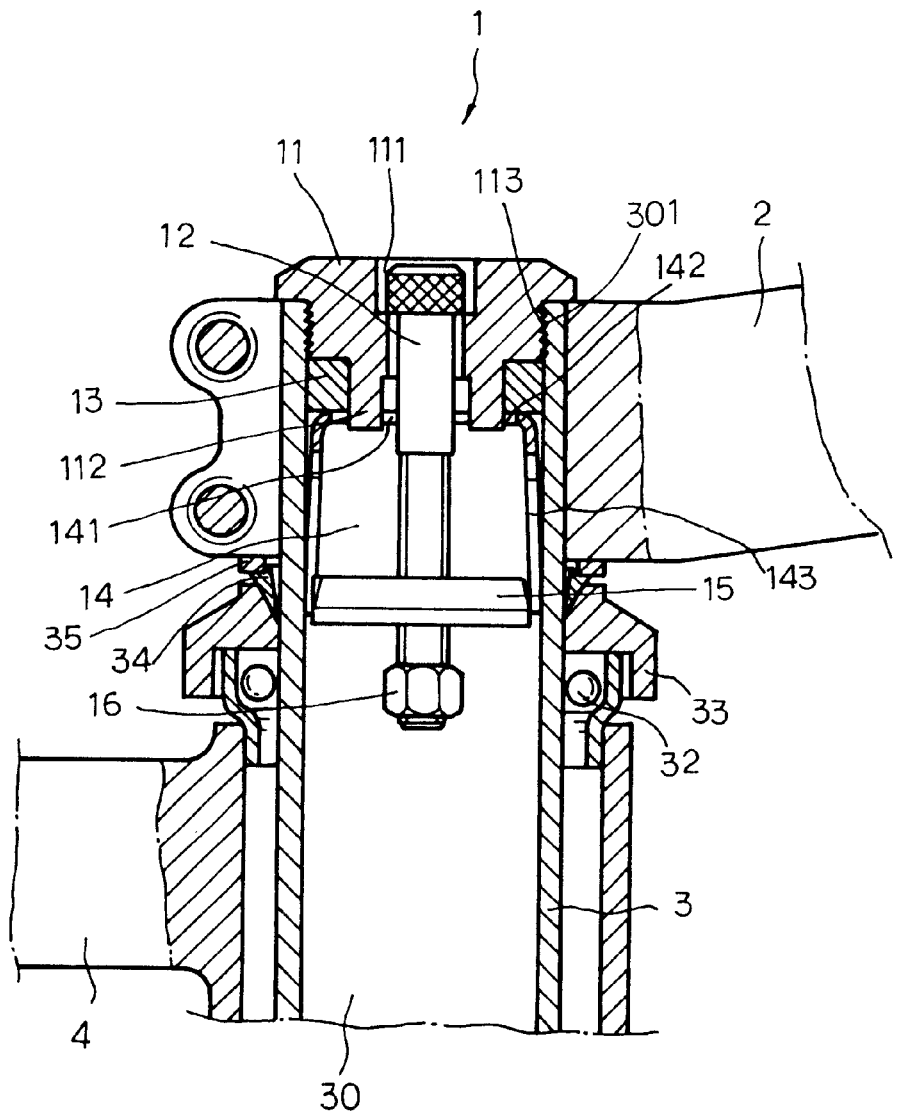
FIG. 2 is a sectional assembly view of the preferred embodiment of the present invention.

Referring to FIG. 2 and FIGS. 1 and 3 again, a lower ball bearing 31 is mounted on a bicycle front fork 3, then a bicycle head tube 4 is sleeved onto the front fork 3, and then an upper ball bearing 32 is mounted on the front fork 3 and supported on the top side of the head tube 4, and then a ball bearing cap 33 is sleeved onto the bicycle front fork 3 and covered on the upper ball bearing 32, and then a tapered rubber ring 34 is mounted in a tapered locating groove 331 at the top side of the ball bearing cap 33 around the bicycle front fork 3, and than a gasket ring 35 is mounted on the tapered rubber ring 34 around the bicycle front fork 3, and then the handlebar stem 2 of a bicycle handlebar (not shown) is coupled to the bicycle front fork 3 and supported on the gasket ring 35, and then the headset 1 is installed in the inner diameter 30 of the bicycle front fork 30 and fastened tight to secure the handlebar stem 2 firmly to the bicycle front fork 3. After insertion of the headset 1 into the inner diameter 30 of the bicycle front fork 30, the threaded shank 113 of the screw cap 11 is threaded into the inner thread 301 in the inner diameter 30 of the bicycle front fork 30, and then the screw bolt 12 is rotated with a screwdriver (not shown) to move the pressure member 15 upwards. When the pressure member 15 is moved upwards, the tapered periphery of the pressure member 15 is engaged into the open bottom side of the tightening up member 14 to expand the tightening up member 14, causing the periphery of the tightening up member 14 to be firmly pressed against the periphery of inner diameter 30 of the bicycle front fork 30, and at the same time the expansible positioning ring 13 is forced to expand and to press against the periphery of the inner diameter 30, and therefore the headset 1 and the bicycle front fork 3 are firmly secured together. When removing the headset 1 from the bicycle front fork 3, the screw bolt 12 must be loosened at first, enabling the tightening up member 14 to be released from the pressure of the pressure member 15.

Referring to FIG. 1 again, the head 114 of the screw cap 11 has a polygonal (square, hexagonal, octagonal) profile convenient for turning with wrench means.

Referring to FIGS. 1 and 3 again, when the screw bolt 12 is rotated in the reversed direction to release the pressure member 15 from the tightening up member 14, the stop member (nut) 16 limits the down stroke of the pressure member 15, preventing the pressure member 15 from falling out of the screw bolt 12.

Referring to FIGS. from 1 through 3 again, the tapered rubber ring 34 has a top flange 341 engaged into the inner diameter 351 of the gasket ring 35 to stop dust and water from passing to the inside of the ball bearing cap 33 and the upper ball bearing 32.

While only one embodiment of the present invention has been shown and described, it will be understood that various modifications and changes could be made thereunto without departing from the spirit and scope of the invention disclosed.

What the invention claimed is:

1. A bicycle handlebar stem and front fork mounting arrangement comprising a front fork, a head tube mounted on said front fork, a ball bearing mounted on said front fork and supported on said head tube, a ball bearing cap mounted on said front fork and covered on said ball bearing, a rubber ring mounted on said ball bearing cap around said front fork, a gasket ring mounted on said rubber ring around said front fork, a handlebar stem coupled to said front fork and supported on said gasket ring, and a headset installed in an inner diameter of said front fork and fastened tight to said front fork to secure said handlebar stem to said front fork, wherein said headset comprises:

- a screw cap threaded into an inner thread in the inner diameter of said front fork, said screw cap comprising a head stopped outside said front fork, a threaded shank threaded into the inner thread in the inner diameter of said front fork, a countersunk hole axially extended through the center of said head and said threaded shank, and two bottom coupling flanges;
- a tightening up member coupled to said screw cap inside said front fork and forced to expand and to press against the periphery of the inner diameter of said front fork, said tightening up member having a top sidewall, a circular hole at the center of said top sidewall, two elongated locating holes formed on said top sidewall and bilaterally outwardly extended from said circular hole in reversed directions and respectively coupled to the coupling flanges of said screw cap, a bottom opening, and a plurality of longitudinal splits extended to said bottom opening;
- an expansible positioning ring mounted around said coupling flanges of said screw cap and supported on the top sidewall of said tightening up member and forced by said tightening up member to expand and to press against the periphery of the inner diameter of said front fork;
- a screw bolt mounted in the countersunk hole on said screw cap and inserted through the circular hole on said tightening up screw;
- a stop member fastened to said screw bolt and suspended into said front fork; and
- a tapered pressure member threaded onto said screw bolt and moved between said stop member and said screw cap upon rotary motion of said screw bolt between a first position where said pressure member is engaged into the bottom opening of said tightening up member, causing said tightening up member to expand and to press against the periphery of the inner diameter of said front fork, and a second position where said pressure member is disengaged from said tightening up member, said tapered pressure member comprising a peripheral projection engaged into one longitudinal split at said tightening up member.

2. The bicycle handlebar stem and front fork mounting arrangement of claim 1 wherein said head of said screw cap has a polygonal cross section fitting a wrench.

3. The bicycle handlebar stem and front fork mounting arrangement of claim 1 wherein said ball bearing cap comprises a locating groove disposed at a top side thereof around said front fork; said rubber ring is a tapered ring mounted in the tapered locating groove on said ball bearing cap, having a top flange retained between said gasket ring and the periphery of said front fork.

* * * * *